(12) United States Patent
Yoshii et al.

(10) Patent No.: US 6,342,282 B1
(45) Date of Patent: Jan. 29, 2002

(54) HEAT-SHRINKABLE MULTI-LAYER FILM

(75) Inventors: Junji Yoshii; Hajime Tsukamoto; Yoshihiro Matsukura; Hisanori Tobita, all of Ibaraki (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/569,077

(22) Filed: May 11, 2000

Related U.S. Application Data

(63) Continuation of application No. 08/864,093, filed on May 28, 1997, now Pat. No. 6,146,727.

(30) Foreign Application Priority Data

May 28, 1996 (JP) .............................................. 8-158203

(51) Int. Cl.$^7$ .............................................. B29D 22/00
(52) U.S. Cl. .................... 428/35.9; 428/34.9; 428/36.7; 428/475.8; 428/483; 428/518
(58) Field of Search .............................. 428/35.9, 34.9, 428/36.7, 483, 475.8, 518

(56) References Cited

U.S. PATENT DOCUMENTS

| | | |
|---|---|---|
| 5,272,236 A | 12/1993 | Lai et al. |
| 5,427,807 A | 6/1995 | Chum et al. |
| 5,525,695 A | 6/1996 | Lei et al. |
| 5,562,958 A | 10/1996 | Walton et al. |
| 5,604,043 A | 2/1997 | Ahlgren |
| 5,629,059 A | 5/1997 | Desai et al. |

FOREIGN PATENT DOCUMENTS

| | | |
|---|---|---|
| EP | 600425 | 6/1993 |
| EP | 707957 | 4/1996 |
| EP | 756931 | 2/1997 |
| WO | WO 9500333 | 1/1995 |
| WO | WO 9533621 | 12/1995 |

*Primary Examiner*—David W. Wu
*Assistant Examiner*—Caixia Lu
(74) *Attorney, Agent, or Firm*—Dinsmore & Shohl LLP

(57) ABSTRACT

The invention provides a heat-shrinkable multi-layer film comprising at least a thermoplastic resin layer as the outermost layer (A), a gas barrier resin layer as a core layer (B) and a sealing resin layer as the innermost layer (C), and optionally an adhesive layer between the individual layers, wherein (1) the sealing resin layer of the innermost layer (C) is a layer formed of a resin material (b) comprising a linear ethylene-1-octene copolymer (a) obtained by using a constrained geometry catalyst and having an 1-octene content not lower than 1 wt. % but lower than 20 wt. % and a density higher than 0.885 g/cm$^3$ but not higher than 0.960 g/cm$^3$, and (2) an intermediate layer (D1) formed of at least one resin (c) selected from the group consisting of polyamide resins, thermoplastic polyester resins and ethylene copolymer resins is provided between the outermost layer (A) and the core layer (B). The film has excellent sealing properties, clarity, mechanical strength, stretchability and bag-making property.

21 Claims, 1 Drawing Sheet

HEAT-SHRINKABLE MULTI-LAYER FILM

This application is a continuation application of application Ser. No. 08/864,093 filed May 28, 1997, now U.S. Pat. No. 6,146,727, issued Nov. 14, 2000.

FIELD OF THE INVENTION

The present invention relates to a heat-shrinkable multi-layer film, and more particularly to heat-shrinkable multi-layer films which are excellent in sealing properties such as good sealability through contamination, stable sealing strength, wide sealing range, low-temperature sealability and hot tack property, optical properties such as clarity, impact strength, puncture resistance, low-temperature resistance, heat resistance, low extraction property, gas barrier properties, blocking resistance, slip property, and bag-making property. The heat-shrinkable multi-layer films according to the present invention are suitable for use as packaging materials for vacuum shrink packaging and modified atmosphere packaging (MAP) of, for example, processed meat products, fresh red meat (FRM) and cheeses.

BACKGROUND OF THE INVENTION

Heat-shrinkable multi-layer films have heretofore been widely used in the form of vacuum shrink packages and MAP in fields of which good gas barrier property is required, such as processed meat products, fresh red meat (FRM) and cheeses. The heat-shrinkable multi-layer films are used as bag products subjected to sealing by a method such as heat, impulse or high frequency, or films subjected to packaging machines.

A representative basic structure of the conventional heat-shrinkable multi-layer films is composed of (1) a gas barrier resin such as polyvinylidene chloride (PVDC) resin or ethylene-vinyl alcohol copolymer (EVOH) resin, provided as a core layer, (2) a heat-sealing resin selected from the group consisting of polyolefin (PO) resins such as low density polyethylene (LDPE), linear low density polyethylene (LLDPE) and very low density or ultra low density polyethylene (VLDPE or ULDPE), ionomer resins, ethylene-vinyl acetate (EVA) resins, etc., provided as an inner layer, and (3) a thermoplastic resin having excellent abuse resistance, slip property, package machinability, etc., provided as an outer layer. There has recently been proposed a multi-layer film provided, as a sealing resin layer, with a PO resin obtained by using metallocene catalyst (may also be referred to as single-site or Kaminsky catalyst).

However, the heat-shrinkable multi-layer films obtained by using such a known resin as describe above as a sealing resin layer have not achieved fully satisfactory performance as bag products under the circumstances. For example, the heat-shrinkable multi-layer films making use of LDPE in a sealing resin layer involve drawbacks that they have insufficient sealing strength and poor sealability through contamination because part (contamination) of the contents, which have adhered to sealing surfaces upon filling of the contents, form the cause of insufficient sealing. In the case where LLDPE is used as a sealing resin layer, the resulting heat-shrinkable multi-layer film has poor low-temperature sealability. In the case where EVA is used as a sealing resin layer, the resulting heat-shrinkable multi-layer film has insufficient sealing strength.

In the case where LLDPE or VLDPE polymerized using the conventional metallocene catalyst is used as a sealing resin layer, the resulting multi-layer film involves such problems that when the multi-layer film is extruded, motor torque in an extruder and pressure increase. Accordingly, productivity cannot be achieved. In addition, the resulting film with melt fracture (disordered irregularities) is insufficient in sealing properties such as sealing strength, fails to provide a beautifully finished seal line, impairs the appearance of a product packaged due to its poor clarity and moreover can not make the best use of the features of the polyethylene resins obtained by using the metallocene catalyst because its sealing strength becomes insufficient upon heat sterilization in the field of multi-layer films and casings having high shrinkage stress and heat shrink.

OBJECTS AND SUMMARY OF THE INVENTION

It is therefore an object of the present invention to provide a heat-shrinkable multi-layer film which is excellent in sealing properties such as low-temperature sealability, sealability through contamination and hot tack property, low extraction property, clarity, heat shrinkability, heat resistance, gas barrier property, etc.

Another object of the present invention is to provide a heat-shrinkable packaging material which is excellent in blocking resistance and slip property and is also excellent in high-speed bag-making property or high-speed filling property in a bag-making step or automatic packaging step.

A further object of the present invention is to provide a heat-shrinkable multi-layer film provided with a sealing resin layer having excellent blocking resistance, slip property, formability and processability compared with the ethylene-α-olefin copolymers, VLDPE and EVA obtained by using the conventional Ziegler-Natta catalyst, or the polyethylene resins obtained by using the conventional metallocene catalyst.

The present inventors have carried out an extensive investigation with a view toward overcoming the above-described problems involved in the prior art. As a result, it has been found that when in a heat-shrinkable multi-layer film having at least a thermoplastic resin layer as the outermost layer, a gas barrier resin layer as a core layer and a sealing resin layer as the innermost layer, a layer formed of a resin material comprising a substantially linear ethylene-1-octene copolymer obtained by using a constrained geometry catalyst (CGC) is provided as the sealing resin layer, and an intermediate layer formed of a specific resin is provided at least between the outermost layer and the core layer, the above objects can be achieved. When a layer of the ethylene-1-octene copolymer is also provided as the outermost layer, a heat-shrinkable multi-layer film having good slip property can be obtained. The present invention has been led to completion on the basis of these findings.

According to the present invention, there is thus provided a heat-shrinkable multi-layer film comprising at least a thermoplastic resin layer as the outermost layer (A), a gas barrier resin layer as a core layer (B) and a sealing resin layer as the innermost layer (C), and optionally an adhesive layer between the individual layers, wherein (1) the sealing resin layer of the innermost layer (C) is a layer formed of a resin material (b) comprising a linear ethylene-1-octene copolymer (a) obtained by using a constrained geometry catalyst and having an 1-octene content not lower than 1 wt. % but lower than 20 wt. % and a density higher than 0.885 g/cm$^3$ but not higher than 0.960 g/cm$^3$, and (2) an intermediate layer (D1) formed of at least one resin (c) selected from the group consisting of polyamide resins, thermoplastic polyester resins and ethylene copolymer resins is provided between the outermost layer (A) and the core layer (B).

According to the present invention, there is also provided a heat-shrinkable multi-layer film wherein an intermediate layer (D2) formed of at least one resin (c) selected from the group consisting of polyamide resins, thermoplastic polyester resins and ethylene copolymer resins is further provided between the core layer (B) and the innermost layer (C).

The resin material (b) forming the sealing resin layer of the innermost layer (C) may preferably be a resin material comprising 10–100 wt. % of the ethylene-1-octene copolymer (a) and 0–90 wt. % of at least one polymer (d) selected from the group consisting of linear low density polyethylene (LLDPE), very low density polyethylene (VLDPE) and ethylene-1-octene copolymer elastomers obtained by using a constrained geometry catalyst and having an 1-octene content of 18 wt. % or higher and a density of 0.885 g/cm$^3$ or lower.

The thermoplastic resin forming the outermost layer (A) may preferably be at least one resin (e) selected from the group consisting of polyolefin resins such as linear low density polyethylene (LLDPE) and very low density polyethylene (VLDPE); thermoplastic polyester resins such as copolyester (Co-PET); polyamide resins such as aliphatic nylon and aromatic nylon; and the ethylene-1-octene copolymer (a) obtained by using a constrained geometry catalyst. In particular, when a layer of the ethylene-1-octene copolymer (a) is also provided as the outermost layer (A), a heat-shrinkable multi-layer film having excellent sealing properties, clarity and mechanical strength and far excellent blocking resistance and slip property is provided.

DETAILED DESCRIPTION OF PREFERRED EMBODIMENTS

Innermost Layer

Figure 1:
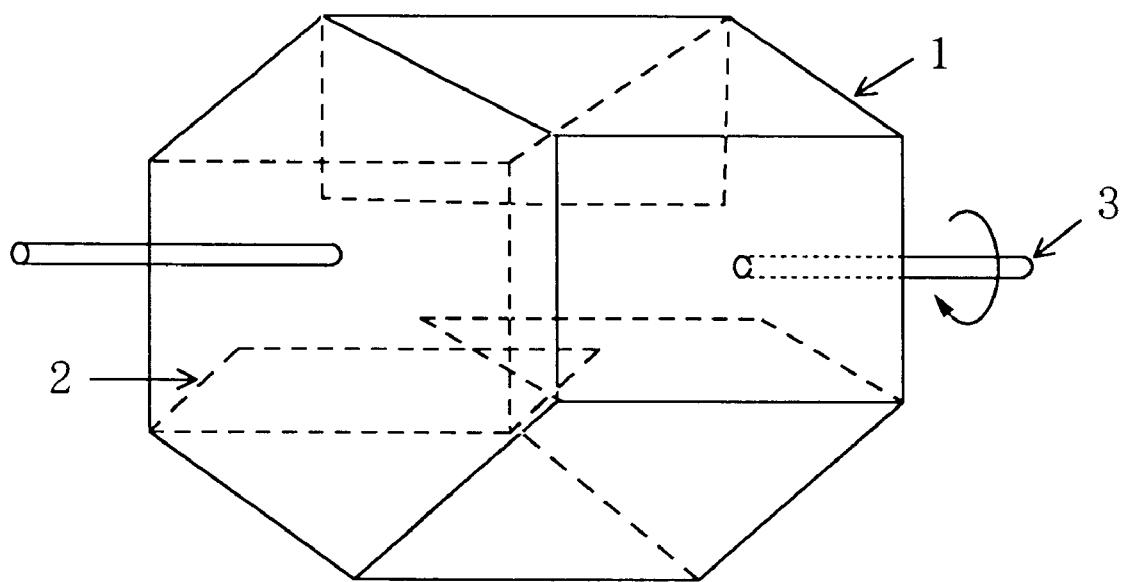
FIG. 1 schematically illustrates an apparatus for determining the low-temperature resistance (abuse resistance at a low temperature) of a heat-shrinkable multi-layer film.

In the present invention, a resin material (b) comprising a substantially linear ethylene-1-octene copolymer (a) obtained by addition polymerization using a constrained geometry catalyst is used as the innermost layer (C) of the heat-shrinkable multi-layer film. The constrained geometry catalyst (CGC) is a kind of metallocene catalysts developed by Dow Chemical Company. The ethylene-1-octene copolymer obtained by using the constrained geometry catalyst is a substantially linear polyethylene resin (hereinafter referred to as "CGC-PE") the number of long-chain branches per 1000 carbon atoms of which is from about 0.01 to about 3, preferably from about 0.01 to about 1, more preferably from about 0.05 to about 1. The selective incorporation of the long-chain branches having a chain length of at least about 6 carbon atoms into the ethylene-1-octene copolymer gives the polymer excellent physical properties and good moldability or formability.

A preparation process of the ethylene polymer using such a constrained geometry catalyst is disclosed in U.S. Pat. Nos. 5,272,236 and 5,427,807. In particular, U.S. Pat. No. 5,427,807 proposes that films formed of an ethylene-α-olefin copolymer obtained by using the constrained geometry catalyst are used for food packaging. Specifically, a monolayer film, a gas-permeable, oriented multi-layer film, a stretch overwrap multi-layer film, etc., which comprise the ethylene-α-olefin copolymer, are disclosed.

The ethylene-1-octene copolymer (a) useful in the practice of the present invention has a non-elastomeric resin having an 1-octene content not lower than 1 wt. % but lower than 20 wt. %, preferably 2–15 wt. %, more preferably 7–15 wt. % and a density higher than 0.885 g/cm$^3$. Even in ethylene-1-octene copolymers obtained by using the constrained geometry catalyst, very low density copolymers having an 1-octene content of at least 18 wt. %, often at least 20 wt. % and a density of 0.885 g/cm$^3$ or lower, often 0.880 g/cm$^3$ or lower are elastomers. In general, a simple elastomer is difficult to be processed into a film, has insufficient heat resistance and becomes too great in elastic recovery when it is used in the innermost layer, so that there is a possibility of causing such a disadvantage that a soft product to be packaged may be crushed, meat juice may be squeezed out, which forms the cause of degeneration, or a sealed part may be separated. For example, the ethylene-α-olefin copolymers obtained by using the conventional Ziegler-Natta catalyst and having a molecular weight distribution, Mw/Mn of about 2, and TAFMER (trade name, product of Mitsui Petrochemical Industries, Ltd.; ethylene-1-octene copolymer) are elastomers.

The ethylene-1-octene copolymer (a) used in the present invention has a melt flow ratio, $I_{10}/I_2$ (as measured in accordance with ASTM D-1238) of generally at least 5.63, preferably 6.5–15.0, more preferably 7.0–10.5. In the substantially linear ethylene-1-octene copolymer (a), the melt flow ratio, $I_{10}/I_2$ indicates the degree of long-chain branching, and a greater melt flow ratio value indicates more long-chain branches in the polymer.

The ethylene-1-octene copolymer (a) used in the present invention has a molecular weight distribution ratio, Mw/Mn (polydiversity) as measured by gel permeation chromatography (GPC), which satisfies the equation:

$$Mw/Mn < (I_{10}/I_2) - 4.63.$$

The molecular weight distribution, Mw/Mn is preferably 1.5–2.5, more preferably 1.8–2.3. A copolymer having too great molecular weight distribution results in a film having insufficient clarity and low-temperature sealability. In the LLDPE and VLDPE obtained by using the conventional Ziegler-Natta catalyst, the molecular weight distribution becomes greater as the melt flow ratio, $I_{10}/I_2$ is higher. If $I_{10}/I_2$ is 5.63 or higher, Mw/Mn exceeds 3.0 and is not equal to 2.5 or smaller. On the other hand, the ethylene-1-octene copolymer obtained by using the constrained geometry catalyst can be provided as a polymer having a substantially constant Mw/Mn value of 1.8–2.3, preferably 1.9–2.3 (about 2) even when its melt flow ratio, $I_{10}/I_2$ varies, for example, between 7 and 10. Namely, the ethylene-1-octene copolymer (a) used in the present invention has a feature that its melt flow ratio, $I_{10}/I_2$ is independent of its molecular weight distribution, Mw/Mn. This feature is not found in the conventional polyethylene resins such as LLDPE and VLDPE.

The ethylene-1-octene copolymer (a) used in the present invention has a density higher than 0.885 g/cm$^3$ but not higher than 0.960 g/cm$^3$, preferably 0.890–0.935 g/cm$^3$, more preferably 0.895–0.915 g/cm$^3$. A copolymer having a density of 0.885 g/cm$^3$ or lower is difficult to be processed into a film and has insufficient heat resistance. On the other hand, a copolymer having a density exceeding 0.960 g/cm$^3$ is difficult to be extruded and formed into film, and a copolymer having a density exceeding 0.935 g/cm$^3$ is difficult to achieve high heat shrinkage stress and heat shrink.

The ethylene-1-octene copolymer (a) used in the present invention has a melt flow rate (MFR; as measured in accordance with ASTM D-1238) of generally 0.5–20 g/10 min, preferably 0.5–7 g/10 min, more preferably 1–5 g/10 min. A copolymer having an MFR within the above range is preferred from the viewpoint of mechanical properties and processability.

The ethylene-1-octene copolymer (a) used in the present invention has a DRI (Dow Reology Index) of generally 0.2–20, preferably 0.4–10. The polyethylene resins obtained by using the conventional catalyst have an DRI of 0. The greater the DRI value, the more long-chain branching in the polymer and the better the processability. Incidentally, DRI is a value calculated in accordance with the equation:

$$DRI=(3.65 \times \tau_0/\eta_0 - 1)/10$$

wherein $\tau_0$ is the characteristic relaxation time, and $\eta_0$ is the zero shear viscosity.

The ethylene-1-octene copolymer (a) used in the present invention has a melting point (Tm) of 80–130° C., preferably 85–125° C., more preferably 88–115° C. as measured by a differential scanning calorimeter (DSC).

The composition and physical properties of the ethylene-1-octene copolymer (a) preferably used in the present invention are here arranged and are as follows:

(i) the copolymer is a copolymer obtained by subjecting ethylene and 1-octene to addition copolymerization using a constrained geometry catalyst (CGC);

(ii) the copolymer has an 1-octene content not lower than 1 wt. % but lower than 20 wt. %, preferably 2–15 wt. %, more preferably 7–15 wt. %;

(iii) the copolymer has a density higher than 0.885 g/cm$^3$ but not higher than 0.960 g/cm$^3$, preferably 0.890–0.935 g/cm$^3$, more preferably 0.895–0915 g/cm$^3$;

(iv) the copolymer is a substantially linear polyethylene resin containing about 0.01 to about 3 long-chain branches, preferably about 0.01 to about 1 long-chain branch, more preferably about 0.05 to about 1 long-chain branch, per 1000 carbon atoms in its molecule;

(v) the copolymer has a melt flow ratio, $I_{10}/I_2$ of generally at least 5.63, preferably 6.5–15.0, more preferably 7.0–10.5;

(vi) the copolymer has a molecular weight distribution, Mw/Mn satisfying the equation:

$$Mw/Mn \leq (I_{10}/I_2) - 4.63,$$

preferably 1.5–2.5, more preferably 1.8–2.3, most preferably 1.9–2.2;

(vii) the copolymer has a melt flow rate (MFR) of generally 0.5–20 g/10 min, preferably 1–5 g/10 min;

(viii) the copolymer has a DRI of generally 0.2–20, preferably 0.4–10; and (ix) the copolymer has a melting point (Tm) of generally 80–130° C., preferably 85–125° C., more preferably 88–115° C. as measured by DSC.

The substantially linear ethylene-1-octene copolymer obtained by using the constrained geometry catalyst has long-chain branches in its molecule and is hard to produce melt fracture in a wider processing range (shear rate range) compared with the polyethylene resins obtained by using other metallocene catalysts (for example, EXACT, trade name, product of EXXON Company). This ethylene-1-octene copolymer has great dependence of melt viscosity on shear rate and has features that it greatly decreases its melt viscosity (has high shear sensitivity) at a high shear rate, and does not very raise a motor load and has a small back pressure compared with the polyethylene resins obtained by using other conventional metallocene catalysts. The ethylene-1-octene copolymer has great melt strength and is also excellent from the viewpoint of bubble stability in a bubble process upon film formation.

The ethylene-1-octene copolymers having such features include AFFINITY™ series sold by Dow Chemical Company as a kind of INSITE TECHNOLOGY™ POLYMER (ITP). A preferable one may be chosen for use among them. In particular, the use of one having a molecular weight distribution, Mw/Mn of about 2 also exhibits excellent performance from the viewpoint of low extraction property. Examples of the AFFINITY™ series by Dow Chemical Company, which can be used in the present invention, are shown in Table 1.

TABLE 1

| Grade | 1-Octene content (wt. %) | MFR (g/10 min) | Density (g/cm$^3$) | $I_{10}/I_2$ | DRI | Tm (° C.) |
|---|---|---|---|---|---|---|
| FM 1570 | 7.5 | 1.0 | 0.915 | 10.0 | 4.9 | 108 |
| PL 1840 | 9.5 | 1.0 | 0.908 | 10.0 | 4.6 | 103 |
| PL 1880 | 12.0 | 1.0 | 0.902 | 9.0 | 3.6 | 100 |
| PF 1140 | 14.5 | 1.6 | 0.895 | 10.2 | 4.4 | 89 |
| HF 1030 | 2.0 | 2.5 | 0.935 | 9.5 | 0.9 | 121 |
| FW 1650 | 12.0 | 3.0 | 0.902 | 8.0 | 0.8 | 99 |
| PL 1845 | 9.5 | 3.5 | 0.910 | 8.5 | 0.4 | 103 |

(Note) The above polymers each have a molecular weight distribution, Mw/Mn within a range of 1.9–2.2.

In the present invention, the above specific ethylene-1-octene copolymers may be used either singly or in any combination thereof in the sealing resin layer of the innermost layer (C). A resin composition obtained by blending the ethylene-1-octene copolymer with other polymer(s) may be used in the sealing resin layer. Preferable other polymers are polyolefin (PO) resins.

Examples of other PO resins include linear low density polyethylene (LLDPE) and very low density polyethylene (VLDPE; may be referred to as "ULDPE"). When one or more of these PO resins are blended with the ethylene-1-octene copolymer, the bubble stability in a bubble process upon film formation of the resulting resin composition becomes better, so that the resulting film is more improved in stretchability and heat resistance.

LLDPE and VLDPE used in combination herein are polymers produced in accordance with the conventionally known techniques, and preferable examples thereof include DOWLEX 2047 (trade name, product of Dow Chemical Company;

density: 0.917 g/cm$^3$, MFR: 2.3 g/10 min, melting point: 120° C.), SUMIKATHENE FZ205-0 (trade name, product of Sumitomo Chemical Co., Ltd.; density: 0.918 g/cm$^3$, MFR: 2.0 g/10 min, melting point: 118° C.) and SUMIKATHENE FZ251-1 (trade name, product of Sumitomo Chemical Co., Ltd.; density: 0.916 g/cm$^3$, MFR: 2.0 g/10 min, melting point: 118° C.), to which, however, the invention is not limited.

Other polymers include ethylene-1-octene copolymer elastomers obtained by using a constrained geometry catalyst and having an octene content of 18 wt. % or higher and a density of 0.885 g/cm$^3$ or lower. Such an ethylene-1-octene copolymer elastomer is blended with the ethylene-1-octene copolymer (a), the flexibility and low-temperature resistance of the resulting multi-layer film can be improved. As such elastomers, may be mentioned ENGAGE™ series produced by Dow Chemical Company. Specific examples of the elastomers include ENGAGE EG8100 (1-octene content: 24 wt. %, density: 0.870 g/cm$^3$), ENGAGE EG8150 (1-octene content: 25 wt. %, density: 0.868 g/cm$^3$), ENGAGE EG8200 (1-octene content: 24 wt. %, density: 0.870 g/cm$^3$), ENGAGE CL8003 (1-octene content: 18 wt. %, density: 0.885 g/cm$^3$) and ENGAGE KC8852 (1-octene content: 22 wt. %, density: 0.875 g/cm$^3$). Of these, ethylene-1-octene copolymer elastomers having an octene content of 20 wt. % or higher and a density of 0.880 g/cm$^3$ or lower are preferred.

When the other polymers are blended for use, compounding proportions in the blend are 10–100 wt. %, preferably 30–100 wt. %, more preferably 60–100 wt. % for the ethylene-1-octene copolymer (a) and 0–90 wt. %, preferably 0–70 wt. %, more preferably 0–40 wt. % for the other polymers. In order to derive an advantage from the blending of the other polymers, it is desirable to use a resin composition containing 30–95 wt. %, preferably 35–90 wt. % of the ethylene-1-octene copolymer (a) and 5–70 wt. %, preferably 10–65 wt. % of the other polymers.

If the proportion of the ethylene-1-octene copolymer (a) obtained by using the constrained geometry catalyst is too low, the effect of improving the sealing properties becomes little, so that the heat resistance of the resulting package under conditions of high heat shrinkage stress and heat shrink becomes insufficient. In addition, the bag-making property of the resulting multi-layer film is deteriorated as wrinkles occur upon the folding of the film in its stretching and processing unless a lubricant (slip agent), an antiblocking agent and an inorganic filler are added in relatively large amounts. Further, the clarity inherent in the ethylene-1-octene copolymer (a) is also not brought about.

In order not to add at least the lubricant in the field of flexible packages, it is further preferable to use a substantially linear ethylene-1-octene copolymer (a1) having an 1-octene content of 7–15 wt. % and a density of 0.895–0.915 g/cm$^3$ as the ethylene-1-octene copolymer (a). When the density of the ethylene-1-octene copolymer is 0.915 g/cm$^3$ or lower, a multi-layer film having high heat shrinkage stress and heat shrink can be obtained with ease. When such a copolymer is blended with the other polymers, it is preferable to use the ethylene-1-octene copolymer (a1) and at least one polymer (d) selected from the group consisting of linear low density polyethylene (LLDPE), very low density polyethylene (VLDPE) and ethylene-1-octene copolymer elastomers obtained by using the constrained geometry catalyst and having an 1-octene content of 18 wt. % or higher and a density of 0.885 g/cm$^3$ or lower in proportions of 60–100 wt. % and 0–40 wt. %, respectively.

Outermost Layer

A thermoplastic resin is provided as the outermost layer (A) of the heat-shrinkable multi-layer film according to the present invention. Examples of the thermoplastic resin include polyolefin resins, thermoplastic polyester resins, polyamide resins, and the same ethylene-1-octene copolymers (a) as those used in the sealing resin layer and obtained by using the constrained geometry catalyst.

Examples of the polyolefin resins include the conventional ethylene-α-olefin copolymers (for example, LLDPE and VLDPE), ethylene-propylene copolymers, ionomer resins, EVA, ethylene-acrylic acid copolymers, ethylene-methacrylic acid copolymer (EMAA) resins, modified polyolefins (for example, reaction products of homopolymers and copolymers of olefins with an unsaturated carboxylic acid such as maleic acid or fumaric acid, or an acid anhydride or metal salt thereof), and polypropylene (PP) resins. Examples of the thermoplastic polyester resins include poly-ethylene terephthalate (PET) resins, polybutylene terephthalate (PBT) resins and copolyester (Co-PET) resins. Examples of the polyamide resins include aliphatic nylon and aromatic nylon.

When heat resistance is required of the resulting multi-layer film, it is preferable to use a polypropylene (PP) resin, copolyester (Co-PET) resin, aliphatic nylon or aromatic nylon as the outermost layer. Preferable examples of Co-PET include those containing isophthalic acid or cyclohexanedimethanol as a comonomer and having an IV value of about 0.7–0.8. These thermoplastic resins may be used either singly or in any combination thereof.

It is preferable to use LLDPE, VLDPE or Co-PET as the outermost layer because a heat-shrinkable multi-layer film having excellent bag-making property, clarity, resistance to boiling and puncture resistance can be obtained. When the ethylene-1-octene copolymer (a), preferably the ethylene-1-octene copolymer (a1) obtained by using the constrained geometry catalyst is used in the outermost layer and/or the innermost layer, particularly, the outermost layer, the slip property of the resulting multi-layer film becomes good, so that there is no need to add any slip agent (lubricant), or the amount of the slip agent to be added can be lessened. As a result, the resulting film can be prevented from reducing its clarity.

Core Layer

In the heat-shrinkable multi-layer film according to the present invention, a resin layer having oxygen gas barrier property is provided as the core layer (B). Examples of the resin forming the core layer include PVDC, EVOH, poly(m-xylylene adipamide) (nylon MXD6), polyhexamethylene isophthlamide/terephthalamide (nylon 6I/6T) and acrylonitrile copolymers. Preferable examples of PVDC include copolymers having a vinylidene chloride (VD) content of at least 50 wt. %, preferably at least 75 wt. % and making use of vinyl chloride (VC) and/or methyl acrylate (MA) as a comonomer. A stabilizer, an antioxidant and the like are generally added to PVDC.

Preferable examples of EVOH include those having an ethylene content of 29–50 mol % and a saponification degree of at least 95%. Examples of such EVOH include EVAL (trade name) resins (for example, EVAL EP-E having an ethylene content of 44 mol %, EVAL EP-H having an ethylene content of 38 mol % and EVAL EP-G having an ethylene content of 47 mol %) produced by Kuraray Industries, Inc. Maleic anhydride-grafted styrene-butadiene rubber (SEBS) may be added as a softening agent to EVOH. The softening agent is preferably incorporated in a proportion of 5–55 vol. % based on the total volume of EVOH and the softening agent. If the proportion is lower than 5 vol. %, the softening effect becomes little. If the proportion exceeds 55 vol. % on the other hand, the gas barrier property of the resulting multi-layer film is greatly lowered.

Among the above-described gas barrier resins, EVOH and nylon MXD6, and PVDC are particularly preferred because the former resins and PVDC are excellent in points of co-extrusion processability and low dependence of oxygen gas barrier property on humidity, respectively.

Intermediate Layer

The heat-shrinkable multi-layer film according to the present invention includes the thermoplastic resin layer as the outermost layer (A), the gas barrier resin layer as the core layer (B) and the sealing resin layer as the innermost layer (C) and optionally an adhesive layer between the individual layers. Layers of various resins are provided between the outermost layer (A) and the innermost layer (C), as other intermediate layers than the core layer (B). In the present invention, an intermediate layer (D1) is provided between the outermost layer (A) and the core layer (B). An intermediate layer (D2) may be additionally provided between the core layer (B) and the innermost layer (C). These intermediate layers are laminated on the other layers, as needed, through an adhesive layer. As a resin forming each intermediate layer, a resin material having excellent low-temperature strength and heat resistance is preferred. More specifically, at least one resin (c) selected from the group consisting of polyamide resins, thermoplastic polyester resins and ethylene copolymer resins is used as the resin forming the intermediate layer.

For example, when a polyamide (PA) resin layer is provided as the intermediate layer, the low-temperature strength and heat resistance of the resulting multi-layer film are improved. Examples of the PA resin include aliphatic polyamides such as nylon 6, nylon 66, nylon 610, nylon 12, nylon 6.66 and nylon 6.12 and aromatic nylon. Of these, nylon 6.66 (for example, molar ratio of the comonomers: 80/20 to 85/15) and nylon 6.12 are preferred from the viewpoint of formability or moldability and processability. These PA resins may be used either singly or in any combination thereof.

Even when a thermoplastic polyester resin such as polyethylene terephthalate (PET), polybutylene terephthalate (PBT) or Co-PET is used as the intermediate layer, the low-temperature strength and heat resistance of the resulting multi-layer film are improved.

When an ethylene copolymer resin such as EMAA or EVA is used as the intermediate layer, the film-forming property, stretchability, crosslinkability by exposure to electron beam and mechanical strength of the resulting multi-layer film can be improved.

In the present invention, the intermediate layer (D1) is at least provided between the outermost layer (A) and the core layer (B). The heat-shrinkable multi-layer film according to the present invention is produced by stretching an unstretched multi-layer film obtained by laminating the individual layers. The stretchability of the unstretched multi-layer film is improved by providing the intermediate layer (D1). When the unstretched multi-layer film is stretched, it is often exposed to ionizing radiation such as electron beam to crosslink before stretching. The exposure to ionizing radiation is generally carried out from the side of the outermost layer. When the intermediate layer (D1) is provided between the outermost layer (A) and the core layer (B), the ionizing radiation penetrates up to the intermediate layer (D1) through the outermost layer (A), but does not penetrate into the gas barrier resin layer of the core layer (B), so that deterioration and discoloration of the layer of the gas barrier resin such as PVDC by the radiation are prevented. In addition, the stretchability of the intermediate layer (D1) is further improved by the radiation crosslinking. When an intermediate layer (D2) is additionally provided between the core layer (B) and the innermost layer (C), the stretchability and film-forming property of the resulting multi-layer film are further improved.

Adhesive Layer

In order to impart adhesion property to the individual layers or enhance their adhesion properties, as needed, an adhesive layer may be provided between the individual layers in the heat-shrinkable multi-layer film according to the present invention. Examples of a resin constructing the adhesive layer include acidly modified ethylene-acrylic acid copolymers (EAA), acidly modified ethylene-ethyl acrylate copolymer (EEA), acidly modified VLDPE, acidly modified LLDPE, acidly modified ionomer resins, ethylene-vinyl acetate copolymers (EVA) and thermoplastic polyurethane elastomers. Examples of an acid used for acid modification include maleic acid, itaconic acid and anhydrides thereof, acrylic acid, and methacrylic acid. It goes without saying that there is no need to provide the adhesive layer so far as the adhesion strength between the individual layers is sufficient.

Heat-shrinkable Multi-layer Film

Examples of the laminated structure of the heat-shrinkable multi-layer film according to the present invention may include the following structures:
(1) Outermost layer (A)/adhesive layer/intermediate layer (D1)/core layer (B)/adhesive layer/innermost layer (C);
(2) Outermost layer (A)/adhesive layer/intermediate layer (D1)/adhesive layer/core layer (B)/adhesive layer/innermost layer (C);
(3) Outermost layer (A)/intermediate layer(D1)/adhesive layer/core layer (B)/adhesive layer/innermost layer (C); and
(4) Outermost layer (A)/intermediate layer(D1)/adhesive layer/core layer (B)/adhesive layer/intermediate layer (D2)/innermost layer (C).

Specific examples of the laminated structure of the heat-shrinkable multi-layer film according to the present invention may include the following structures:
(i) Thermoplastic polyester resin/adhesive/polyamide resin/EVOH/adhesive/resin material (b); more specifically,
(i-1) Co-PET/adhesive/nylon 6.66/EVOH/adhesive/ethylene-1-octene copolymer (a),
(i-2) Co-PET/adhesive/nylon 6.66/EVOH/adhesive/resin composition containing 30–95 wt. % of ethylene-1-octene copolymer (a) and 5–70 wt. % of at least one polymer (d),
(i-3) Co-PET/adhesive/nylon 6.66/EVOH/adhesive/resin composition containing 30–95 wt. % of ethylene-1-octene copolymer (a) and 5–70 wt. % of VLDPE,
(i-4) Co-PET/adhesive/nylon 6.66/EVOH/adhesive/resin composition containing 30–95 wt. % of ethylene-1-octene copolymer (a) and 5–70 wt. % of LLDPE;
(ii) Thermoplastic polyester resin/adhesive/polyamide resin/adhesive/PVDC/adhesive/resin material (b); more specifically,
(ii-1) Co-PET/adhesive/nylon 6.66/adhesive/PVDC/adhesive/ethylene-1-octene copolymer (a),
(ii-2) Co-PET/adhesive/nylon 6.66/adhesive/PVDC/adhesive/resin composition containing 30–95 wt. % of ethylene-1-octene copolymer (a) and 5–70 wt. % of at least one polymer (d),
(ii-3) Co-PET/adhesive/nylon 6.66/adhesive/PVDC/adhesive/resin composition containing 30–95 wt. % of ethylene-1-octene copolymer (a) and 5–70 wt. % of VLDPE,
(ii-4) Co-PET/adhesive/nylon 6.66/adhesive/PVDC/adhesive/resin composition containing 30–95 wt. % of ethylene-1-octene copolymer (a) and 5–70 wt. % of LLDPE;
(iii) Polyolefin resin/ethylene copolymer resin/adhesive/PVDC/adhesive/resin material (b), more specifically,
(iii-1) VLDPE/EMAA/adhesive/PVDC/adhesive/ethylene-1-octene copolymer (a),
(iii-2) VLDPE/EMAA/adhesive/PVDC/adhesive/resin composition containing 30–95 wt. % of ethylene-1-octene copolymer (a) and 5–70 wt. % of at least one polymer (d),
(iii-3) VLDPE/EMAA/adhesive/PVDC/adhesive/resin composition containing 30–95 wt. % of ethylene-1-octene copolymer (a) and 5–70 wt. % of VLDPE,
(iii-4) VLDPE/EMAA/adhesive/PVDC/adhesive/resin composition containing 30–95 wt. % of ethylene-1-octene copolymer (a) and 5–70 wt. % of LLDPE;

(iv) Polyolefin resin/ethylene copolymer resin/adhesive/ PVDC/adhesive/ethylene copolymer resin/resin material (b), more specifically, (iv-1) VLDPE/EMAA/adhesive/PVDC/adhesive/EVA/ ethylene-1-octene copolymer (a), (iv-2) VLDPE/EMAA/adhesive/PVDC/adhesive/EVA/resin composition containing 30–95 wt. % of ethylene-1-octene copolymer (a) and 5–70 wt. % of at least one polymer (d), (iv-3) VLDPE/EMAA/adhesive/PVDC/adhesive/EVA/resin composition containing 30–95 wt. % of ethylene-1-octene copolymer (a) and 5–70 wt. % of VLDPE, (iv-4) VLDPE/EMAA/adhesive/PVDC/adhesive/EVA/resin composition containing 30–95 wt. % of ethylene-1-octene copolymer (a) and 5–70 wt. % of LLDPE;

(v) Ethylene-1-octene copolymer (a)/ethylene copolymer resin/adhesive/PVDC/adhesive/ethylene copolymer resin/ resin material (b), more specifically, (v-1) ethylene-1-octene copolymer (a)/EMAA/adhesive/ PVDC/adhesive/EVA/ethylene-1-octene copolymer (a), (v-2) ethylene-1-octene copolymer (a)/EMAA/adhesive/ PVDC/adhesive/EVA/resin composition containing 30–95 wt. % of ethylene-1-octene copolymer (a) and 5–70 wt. % of at least one polymer (d), (v-3) ethylene-1-octene copolymer (a)/EMAA/adhesive/ PVDC/adhesive/EVA/resin composition containing 30–95 wt. % of ethylene-1-octene copolymer (a) and 5–70 wt. % of VLDPE, and (v-4) ethylene-1-octene copolymer (a)/EMAA/adhesive/ PVDC/adhesive/EVA/resin composition containing 30–95 wt. % of ethylene-1-octene copolymer (a) and 5–70 wt. % of LLDPE.

Of these, particularly preferred are the following laminated structures:

(1) Co-PET/adhesive/nylon 6.66/EVOH/adhesive/ethylene-1-octene copolymer (a);

(2) Co-PET/adhesive/nylon 6.66/EVOH/adhesive/resin composition containing 30–95 wt. % of ethylene-1-octene copolymer (a) and 5–70 wt. % of at least one polymer (d);

(3) VLDPE/EMAA/adhesive/PVDC/adhesive/EVA/ ethylene-1-octene copolymer (a);

(4) VLDPE/EMAA/adhesive/PVDC/adhesive/EVA/resin composition containing 30–95 wt. % of ethylene-1-octene copolymer (a) and 5–70 wt. % of at least one polymer (d); and (5) ethylene-1-octene copolymer (a)/EMAA/adhesive/ PVDC/adhesive/EVA/ethylene-1-octene copolymer (a).

The use of EVA and EMAA in the intermediate layers is intended to contribute to the improvement of stretchability of the resulting multi-layer film. The use of Co-PET in the outermost layer is intended to contribute to the improvement of heat resistance, surface gloss and bag-making property of the resulting multi-layer film.

The thickness of the heat-shrinkable multi-layer films according to the present invention is generally 10–200 µm, preferably 20–150 µm, more preferably 30–120 µm. If the thickness is smaller than 10 µm, sufficient mechanical properties cannot be achieved. If the thickness exceeds 200 µm, the clarity of the resulting multi-layer film is reduced.

The thickness of the sealing resin layer of the innermost layer (C) is generally 5–15 µm, preferably 8–100 µm, more preferably 8–50 µm and is desirably at least 15% of the whole thickness. If the thickness of the sealing resin layer is too small, sufficient sealing strength cannot be achieved.

The thickness of the gas barrier resin layer of the core layer (B) is generally 3–50 µm, preferably 5–20 µm, more preferably 5–15 µm. If the thickness of the gas barrier resin layer is smaller than 3 µm, the oxygen gas barrier property of the resulting multi-layer film is deteriorated. If the thickness exceeds 50 µm, the resulting multi-layer film becomes hard to process.

The outermost layer (A) and the intermediate layer(s) construct the remaining part of the thickness. The thickness of the outermost layer (A) is generally 1–20 µm, preferably 2–15 µm, more preferably 2–10 µm. The thickness of the intermediate layer (D1) is generally 3–50 µm, preferably 4–40 µm, more preferably 5–30 µm. The thickness of the intermediate layer (D2) is generally 3–50 µm, preferably 4–40 µm, more preferably 5–30 µm.

When the thickness of the intermediate layers (D1) and (D2) is within the above range, the stretchability, film-forming property, crosslinkability by exposure to electron beam and bag-making property of the resulting multi-layer film are improved.

Since the heat-shrinkable multi-layer films according to the present invention are provided with the resin layer containing the specific ethylene-1-octene copolymer as the innermost layer, they have an advantage that blocking between the innermost layer and the outermost layer is markedly lightened compared with the conventional sealing resin layer formed of EVA or the like, so that any lubricant (slip agent) may not be added to the innermost layer, or a small amount of the lubricant suffices for the innermost layer if added. In order to improve the slip property of the resulting multi-layer film, a suitable amount of the lubricant may be added to the outermost layer and/or the innermost layer (sealing resin layer). Preferable examples of the lubricant used in such a case may include behenic amide, oleic amide, erucic amide and silica. These lubricants are generally added in the form of a masterbatch. A preferable amount of the lubricant to be added is 1–10 wt. % based on the outermost layer or the sealing resin layer in the case of a masterbatch containing 20 wt. % of the lubricant. When a resin layer containing the specific ethylene-1-octene copolymer, preferably the ethylene-1-octene copolymer (a1) is also provided as the outermost layer, the amount of the lubricant to be added can be decreased to an extremely small amount, or the lubricant may not be added.

The heat-shrinkable multi-layer films according to the present invention can be obtained by extruding the individual resin materials into a co-extruded parison by a co-extrusion process using a plurality of extruders and forming the parison into a film by a known double bubble process. The draw ratio of the film is generally about 1–10 times, preferably 2–5 times in each of machine and transversal directions.

Before or after the stretching, the film may be exposed to ionizing radiation. The stretchability, heat resistance and mechanical strength of the film are more improved compared with an unexposed film. In particular, when the co-extruded parison is exposed to electron beam and then biaxially stretched, the stretchability and heat resistance of the film can be enhanced.

The ionizing radiation includes α-ray, β-ray, γ-ray, electron beam, X-rays, etc. The electron beam is preferred from the viewpoint of crosslinking effect and easy handling. With respect to exposure conditions, in the case of the electron beam, acceleration voltage is preferably within a range of 250–500 kV, and an exposure dose is preferably within a range of 10–200 kGy.

In the heat-shrinkable multi-layer films according to the present invention, the resin layer containing the specific ethylene-1-octene copolymer is used as the sealing resin layer of the innermost layer. Therefore, they are excellent in sealing properties such as low-temperature sealability, sealability through contamination and hot tack property, permit sealing in a wide condition range, are low in extractability of low molecular weight substances (low extraction property) and have good resistance to blocking between the innermost layer and the outermost layer compared with the conventional film products. Since the heat-shrinkable multi-layer films according to the present invention are provided with the intermediate layer (D1) at least between the outermost layer (A) and the core layer (B), they have excellent stretchability and film-forming property, and good low-temperature strength, heat resistance, crosslinkability by exposure to electron beam and mechanical strength. The heat-shrinkable multi-layer films according to the present invention have good optical properties such as clarity, mechanical properties such as puncture resistance and impact strength, resistance to boiling, flexibility, and low-temperature resistance.

The heat-shrinkable multi-layer films according to the present invention are suitable for use as food packaging materials and most suitable for, particularly, shrink packaging for ham, sausage, various processed meats and the like. The heat-shrinkable multi-layer films according to the present invention can be converted in any suitable form according to intended packaging forms such as b ags and tubes.

ADVANTAGES OF THE INVENTION

According to the present invention, the resin layer containing the specific ethylene-1-octene copolymer obtained by using the constrained geometry catalyst is used as the sealing resin layer of the innermost layer, and the intermediate layer is provided at least between the outer most layer and the core layer. There can thus be provided heat-shrinkable multi-layer films which are excellent in sealing properties such as low-temperature sealability, sealability through contamination and hot tack property, permit sealing in a wide seal window, and have low extraction property and good blocking resistance compared with the conventional film products. The heat-shrinkable multi-layer films according to the present invention have good optical properties such as clarity, mechanical properties such as puncture resistance and low-temperature resistance, resistance to boiling, flexibility, and bag-making property. When the layers of the specific ethylene-1-octene copolymer are provided as the outermost and innermost layers, the clarity, sealing properties and mechanical strength of the resulting multi-layer film, and moreover its blocking resistance and slip property are more improved, and so the film can be provided as a heat-shrinkable multi-layer film having far excellent bag-making property.

EMBODIMENTS OF THE INVENTION

The present invention will hereinafter be described specifically by the following Examples and Comparative Examples. However, the present invention is not limited to these examples only.

EXAMPLES 1–4
and

Comparative Examples 1–6

Measuring methods of physical properties and resin materials used in the examples are as follows.
<Measuring Methods of Physical Properties>
(1) Density
The density of a sample was measured in accordance with the density-gradient tube method using a mixed solution of methyl alcohol and benzyl alcohol in accordance with ASTM D-1505.
(2) Molecular Weight Size Distribution Ratio, Mw/Mn (Polydiversity)
In 3 ml of 1,2,4-trichlorobenzene (TCB), 10 mg of a sample were dissolved at 135° C. to measure the molecular weight of the sample by GPC. The weight average molecular weight (Mw) and number average molecular weight (Mn) of the sample were found from a calibration curve by virtue of standard polystyrene, and the molecular weight distribution, Mw/Mn was determined from the Mw and Mn values thus obtained. A measuring apparatus used was a high performance liquid chromatography 150-C (column: SHODEX AT-80, trade name, product of Showa Denko K. K.) manufactured by Waters Co.
(3) Melt Flow Rate (MFR)
The MFR of a sample was measured in accordance with ASTM D-1238. The measurement was conducted at a temperature of 190° C. to determine MFR under a measuring load of 2.16 kg. A measuring apparatus used was a melt indexer manufactured by Toyo Seiki Seisakusho, Ltd.
(4) Flow Ratio ($I_{10}/I_2$)
The flow ratio of a sample was measured in accordance with ASTM D-1238. The measurement was conducted at a temperature of 190° C. to determine an MFR ($I_{10}$) under a measuring load of 10 kg and an MFR ($I_2$) under a measuring load of 2.16 kg. The flow ratio, $I_{10}/I_2$ was found from the $I_{10}$ and $I_2$ value thus obtained.
(5) Clarity (Haze)
The haze (%) of a sample was determined in accordance with JIS K-7105. A measuring apparatus used was a hazeometer, NDH-Σ80 (trade name) manufactured by Nippon Denshoku Kogyo K. K. The haze means that the smaller the haze value, the higher the clarity, or the greater the haze value, the lower the clarity.
(6) Sealing Strength and Low-temperature Sealability
First, 2 multi-layer films were put together in such a manner that their sealing resin layers faced each other, to conduct sealing. A vacuum packaging machine, AG-500 (trade name) manufactured by Multivac Co. was used to seal the multi-layer films. At this time, a sealing temperature was adjusted to 60° C., 80° C., 100° C., 120° C., 140° C., 160° C. or 180° C. by varying a seal dial (sealing time) of the vacuum packaging machine. After the sealed multi-layer films were then fully cooled at room temperature, the sealed part of the sealed sample was separated under conditions of a crosshead speed of 200 mm/min by means of a tensile tester, RTM-100 (trade name) manufactured by Orientex Co. to find a maximum value of a load required for the separation. At this time, the width (width of sealing line) of the sample was 15 mm. The measurement was conducted on 5 samples to find an average value thereof. The greater value of the peel strength at the sealed part indicates that the sealing strength of the sample is greater, while the smaller value of the peel strength at the sealed part indicates that the sealing strength of the sample is smaller. Besides, the greater value of the sealing strength under lower-temperature conditions indicates that the low-temperature sealability of the sample is better.
(7) Sealability Through Contamination
In the above-described measurement of the sealing strength, sealing strength was measured after contamination was coated on the inner surfaces (sealing surfaces) of multi-layer films, thereby evaluating the sealability through contamination of each sample. The contamination used for coating on the innermost layer surface was meat juice (drip) collected from fresh red meat. The greater value of the sealing strength under lower-temperature conditions indicates that the sealability through contamination of the sample is better.

(8) Oxygen Gas Barrier Property

The oxygen gas transmission rate of a sample was measured in accordance with JIS K-7126. A measuring apparatus used was an oxygen transmission measuring instrument, OXTRAN-100 (trade name) manufactured by Modrn Controls Co. The measurement was conducted under conditions of 30° C. and 100% relative humidity.

(9) Heat Shrinkability

A sample film was treated for a predetermined period of time in hot water of a predetermined temperature to shrink it, thereby finding a hot-water shrink in a width direction of the film from a change in width before and after the shrinking. Namely, the hot-water shrink was found in accordance with the following equation:

Hot-water shrink (width direction)=$\{(L_0-L_0)\times 100$ wherein $L_0$ is a width of the film before the shrinking, and $L_1$ is a width of the film after the shrinking. Incidentally, the heat treatment was conducted at 75° C. for 10 seconds.

<Resin Materials>

(1) Constrained Geometry Catalyst-ethylene-1-octene Copolymer (CGC-PE)

AFFINITY™ PL 1840 (hereinafter referred to as "CGC-PE-1"), FW 1650 (hereinafter referred to as "CGC-PE-2"), PL 1845 (hereinafter referred to as "CGC-PE-3") and PF 1140 (hereinafter referred to as "CGC-PE-4") produced by Dow Chemical Company shown in Table 1 were used.

(2) LLDPE

MORETEC VO398CN (trade name, density: 0.907 g/cm$^3$, MFR: 3.3 g/10 min, melting point: 119° C.; hereinafter referred to as "LLDPE-1") produced by Idemitsu Petrochemical Co., Ltd., and SUMIKATHENE αFZ205-0 (trade name; density: 0.918 g/cm$^3$, MFR: 2.0 g/10 min, melting point: 118° C.; hereinafter referred to as "LLDPE-2") produced by Sumitomo Chemical Co., Ltd. were used.

(3) EMAA

NUCREL AN 4217-1C (trade name, density: 0.94 g/cm$^3$, MFR: 2.4 g/10 min, melting point: 87° C.), which is an EMAA resin produced by Mitsui-Du' Pont Polychemicals Co., Ltd., was used.

(4) Adhesive

EVATATE PC-149 (trade name, density: 0.94 g/cm$^3$, MFR: 4.2 g/10 min, melting point: 92° C., vinyl acetate content: 15 wt. %; hereinafter referred to as "EVA-1"), which is an EVA resin produced by Sumitomo Chemical Co., Ltd., was used.

(5) PVDC

Krehalon FB-2 (trade name, vinylidene chloride content: 82 wt. %, vinyl chloride content: 18 wt. %, reduced viscosity, $\eta_{sp/c}$: 0.057), which is a PVDC resin produced by Kureha Chemical Industry Co., Ltd., was used.

(6) EVA Resin

NUC3753 (trade name, density: 0.94 g/cm$^3$, MFR: 1.5 g/10 min, melting point: 93° C., vinyl acetate content: 15 wt. %; hereinafter referred to as "EVA-2"), which is an EVA resin produced by Nippon Unicar Co., Ltd., and FB-821 (trade name, density: 0.93 g/cm$^3$, MFR: 3.0 g/10 min, melting point: 94° C., vinyl acetate content: 10 wt. %; hereinafter referred to as "EVA-3"), which is an EVA resin produced by Nippon Unicar Co., Ltd., were used.

(7) LDPE

SUMIKATHENE F280-1 (trade name; density: 0.922 g/cm$^3$, MFR: 1.5 g/10 min, melting point: 112° C.), which is an LDPE produced by Sumitomo Chemical Co., Ltd., was used.

(8) VLDPE

EXCELLEN VL-401 (trade name; density: 0.906 g/cm$^3$, MFR: 3.3 g/10 min, melting point: 114° C.), which is a VLDPE produced by Sumitomo Chemical Co., Ltd., was used.

(9) Metallocene-catalyst-VLDPE

As VLDPEs obtained by using the conventional metallocene catalyst, EXACT 3006 (trade name; density: 0.910 g/cm$^3$, MFR: 1.0 g/10 min, melting point: 102° C.; hereinafter referred to as "SSC-VLDPE-1") produced by EXXON Company and EXACT 3010C (trade name; density: 0.900 g/cm$^3$, MFR: 3.5 g/10 min, melting point: 89° C.; hereinafter referred to as "SSC-VLDPE-2") produced by EXXON Company were used.

EXAMPLE 1

VLDPE, EMAA, an adhesive, PVDC, an adhesive, EVA and a sealing resin were co-extruded into a tube having the following structure by means of 6 extruders, thereby obtaining a parison (unstretched multi-layer tube). This parison was exposed to electron beam and then stretched each three times in machine and transversal derections by an inflation method, thereby producing a tubular film having a flat width of 400 mm. One opening of the tubular film thus obtained was sealed at a right angle with the take-up direction of the film to produce a bag having a length of 800 mm and a width of 400 mm with an opening on the side opposite to the sealed part. The measurement results of the performance properties are shown in Tables 2–4.

<Layer Structure>

VLDPE-1 (outermost layer)/EMAA (intermediate layer)/EVA-1 (adhesive layer)/PVDC (gas barrier layer)/EVA-1 (adhesive layer)/EVA-2 (intermediate layer)/CGC-PE-1 (innermost layer).

<Thickness of Each Layer (Unit: μm)>

Parison 27 (outermost layer)/189/13.5/63/13.5/90/90 (innermost layer).

Film 3 (outermost layer)/21/1.5/7/1.5/10/10 (innermost layer).

EXAMPLE 2

A bag was produced in the same manner as in Example 1 except that CGC-PE-2 was used in place of the innermost layer in Example 1.

EXAMPLE 3

A bag was produced in the same manner as in Example 1 except that a blend of 70 wt. % of CGC-PE-3 and 30 wt. % of CGC-PE-4 was used in place of the innermost layer in Example 1.

EXAMPLE 4

A bag was produced in the same manner as in Example 1 except that a blend of 55 wt. % of LLDPE-2 and 45 wt. % of CGC-PE-4 was used in place of the innermost layer in Example 1.

Comparative Example 1

A bag was produced in the same manner as in Example 1 except that LDPE was used in place of the innermost layer in Example 1.

Comparative Example 2

A bag was produced in the same manner as in Example 1 except that LLDPE-1 was used in place of the innermost layer in Example 1.

Comparative Example 3

A bag was produced in the same manner as in Example 1 except that VLDPE was used in place of the innermost layer in Example 1.

Comparative Example 4

A bag was produced in the same manner as in Example 1 except that EVA-3 was used in place of the innermost layer in Example 1.

Comparative Example 5

A bag was produced in the same manner as in Example 1 except that SSC-VLDPE-1 was used in place of the innermost layer in Example 1. Upon extrusion of the parison, increase in motor load was observed on the extruders, and melt fracture occurred in the resultant film, so that it was impossible to produce a bag of commercial value.

Comparative Example 6

A bag was produced in the same manner as in Example 1 except that SSC-VLDPE-2 was used in place of the innermost layer in Example 1. Upon extrusion of the parison, increase in motor load was observed on the extruders, and melt fracture occurred in the resultant film, so that it was impossible to produce a bag of commercial value.

The measurement results of the physical properties are shown in Tables 2–4.

TABLE 2

| | Clarity Haze (%) | Gas barrier property Oxygen gas transmission rate [ml (STP)/m² · day · atm{Pa}] | Heat shrinkability Hot-water shrink (%) |
|---|---|---|---|
| Ex. 1 | 2.3 | 40 | 39 |
| Ex. 2 | 2.0 | 40 | 40 |
| Ex. 3 | 2.5 | 40 | 40 |
| Ex. 4 | 2.8 | 40 | 40 |
| Comp. Ex. 1 | 8.0 | 40 | 32 |
| Comp. Ex. 2 | 3.5 | 40 | 40 |
| Comp. Ex. 3 | 3.8 | 40 | 40 |
| Comp. Ex. 4 | 6.0 | 40 | 40 |
| Comp. Ex. 5 | 15.0 | 40 | 39 |
| Comp. Ex. 6 | 10.0 | 40 | 40 |

The results in Table 2 show that the multi-layer films according to Examples 1–4 had excellent clarity. The multi-layer films according to Comparative Examples 1 and 4 had poor clarity. Besides, the multi-layer films according to Comparative Examples 5 and 6 had very poor clarity and an impaired appearance as commercial products because melt fracture occurred in the films.

TABLE 3

| | Sealing strength (kg/15 mm) | | | | | |
|---|---|---|---|---|---|---|
| | 80° C. | 100° C. | 120° C. | 140° C. | 160° C. | 180° C. |
| Ex. 1 | 0.2 | 1.2 | 3.0 | 3.0 | 3.0 | 3.0 |
| Ex. 2 | 0.3 | 1.3 | 2.8 | 3.0 | 3.0 | 3.0 |
| Ex. 3 | 0.5 | 1.4 | 2.9 | 2.9 | 2.9 | 2.9 |

TABLE 3-continued

| | Sealing strength (kg/15 mm) | | | | | |
|---|---|---|---|---|---|---|
| | 80° C. | 100° C. | 120° C. | 140° C. | 160° C. | 180° C. |
| Ex. 4 | 0.4 | 1.3 | 2.8 | 2.8 | 2.8 | 2.8 |
| Comp. Ex. 1 | 0 | 0 | 1.0 | 1.5 | 2.0 | 2.0 |
| Comp. Ex. 2 | 0 | 0.5 | 2.0 | 2.4 | 2.4 | 2.4 |
| Comp. Ex. 3 | 0 | 0.6 | 2.1 | 2.5 | 2.5 | 2.5 |
| Comp. Ex. 4 | 0.5 | 1.6 | 1.8 | 1.8 | 1.8 | 1.8 |
| Comp. Ex. 5 | 0.1 | 0.9 | 3.0 | 3.0 | 3.0 | 3.0 |
| Comp. Ex. 6 | 0.1 | 1.0 | 2.8 | 3.0 | 3.0 | 3.0 |

The results in Table 3 show that the multi-layer films according to Examples 1–4 had excellent sealing strength compared with those according to Comparative Examples 1–4, and also that the multi-layer films according to Examples 1–4 had low-temperature sealability comparable to the film (innermost layer: EVA) of Comparative Example 4.

TABLE 4

| | Sealing strength (kg/15 mm) upon coating with contamination | | | | | |
|---|---|---|---|---|---|---|
| | 80° C. | 100° C. | 120° C. | 140° C. | 160° C. | 180° C. |
| Ex. 1 | 0 | 0.1 | 0.3 | 0.5 | 1.8 | 2.0 |
| Ex. 2 | 0 | 0.2 | 0.4 | 0.8 | 2.0 | 2.0 |
| Ex. 3 | 0 | 0.1 | 0.2 | 0.4 | 1.8 | 1.0 |
| Ex. 4 | 0 | 0.1 | 0.1 | 0.3 | 1.5 | 1.8 |
| Comp. Ex. 1 | 0 | 0 | 0 | 0 | 0.5 | 1.8 |
| Comp. Ex. 2 | 0 | 0 | 0 | 0.1 | 0.8 | 1.5 |
| Comp. Ex. 3 | 0 | 0 | 0 | 0.2 | 1.0 | 1.8 |
| Comp. Ex. 4 | 0 | 0.1 | 0.4 | 0.5 | 0.8 | 0.9 |
| Comp. Ex. 5 | 0 | 0 | 0.1 | 0.4 | 1.7 | 1.9 |
| Comp. Ex. 6 | 0 | 0 | 0.5 | 0.7 | 1.9 | 1.9 |

The results in Table 4 show that the multi-layer films according to Examples 1–4 had excellent sealability through contamination.

EXAMPLES 5–8 AND EXAMPLES 7–9

Measuring methods of physical properties other than those described above are as follows.

(1) Resistance to Boiling

A small bag was produced from a multi-layer film sample, and roast pork was put into the bag. After the bag was vacuum-sealed, the bag was boiled in hot water of 85° C. to observe the states of whitening and break in the bag, thereby evaluating the sample as to resistance to boiling in accordance with the following standard:

⊙: The bag neither broke nor whitened;

○: The bag did not break, but somewhat whitened;

X: The bag broke.

(2) Puncture Resistance

Using a puncture resistance measuring instrument, RTM-100 (trade name) manufactured by Orientec Co., measurement was conducted at a puncture speed of 50 mm/min under conditions of 50% RH. A puncturing needle used was a needle having a diameter of 1 mm and a curvature radius of 0.51 mm at its tip. The evaluation was conducted in accordance with the following standard:

⊚: High performance (higher than 4,000 kg.cm/cm);

○: Medium performance (2,000–4,000 kg.cm/cm);

Δ: Low performance (lower than 2,000 kg.cm/cm).

(3) Low-temperature Resistance

A small bag was produced from a multi-layer film sample, and water was put into the bag to evaluate the sample as to low-temperature resistance in the following method. Namely, the bag filled with water was put into a box 1 of a regular hexagon in section illustrated in FIG. 1. The box was rotated on its axis at 30 rpm. The box 1 is so constructed that three shelves 2 are provided in its interior and it can be rotated by a shaft 3 connected to a driving means. When the box is rotated once, the bag contained in the box comes to be dropped 3 times each by 20 cm by the presence of the shelves. For example, when the box is rotated for 5 minutes, the bag is dropped 450 times in total. Accordingly, the test using this apparatus is a sort of abuse test under low-temperature conditions.

Nine bags were put into this box, and the box was rotated at 5° C. to determine whether the bags broke or not and the number of bags broken (percent break of bag). The low-temperature resistance was evaluated in accordance with the following standard:

⊚: All the bag samples did not break even when the box was rotated for 10 minutes;

○: All the bag samples did not break even when the box was rotated for 5 minutes;

X: Some bag samples broke when the box was rotated for 5 minutes.

(4) Low-temperature Sealability

Using a Dynaweb Heat Seal Machine manufactured by Dynaweb Inc., a film sample was heat-sealed under conditions of a heat sealing pressure of $^2$ kg/cm2 and sealing time of 1 second with a heat sealing temperature varied to measure sealing strength. A heat sealing temperature at which this strength value reached the standard heat-sealing strength or higher was determined to evaluate the sample as to low-temperature sealability in accordance with the following standard:

⊚: Wide range (90–140° C.);

○: Medium range (100–140°);

X: Narrow range (120–140° C.).

(5) Sealability Through Contamination

Using the Dynaweb Heat Seal Machine, a film sample on the surface of which meat juice was coated as contamination was heat-sealed under conditions of a heat sealing temperature of 120° C., a heat sealing pressure of 2 kg/cm$^2$ and sealing time of 1 second. Using a 1122 type tester manufactured by Instron Co., peel strength was measured under conditions of a test width of 15 mm and a crosshead speed of 200 mm/min to evaluate the sample as to sealability through contamination in accordance with the following standard:

⊚: 5 kg/15 mm in width or greater;

○: 3 kg/15 mm in width or greater;

X: 2 kg/15 mm in width or smaller.

(6) Hot Tack Property

Using a Hot Tack Seal Strength Tester manufactured by Teller Co., a film sample was heat-sealed under conditions of a heat sealing pressure of 2 kg/cm$^2$ and sealing time of 1 second with a heat sealing temperature varied. Right after the sealing (about 0.1 second later), peel strength was measured under conditions of a crosshead speed of 600 mm/min to determine a heat sealing temperature at which this strength value reached the standard peel strength or higher, thereby evaluating the sample as to hot tack property in accordance with the following standard:

⊚: Wide range (90–140° C.);

○: Medium range (100–135°);

X: Narrow range (105–130° C.).

(7) Bag-making Property in Bag-making Step

The bag-making speed, slip property and blocking resistance in a bag-making step of a multi-layer film sample were observed collectively to evaluate the sample as to bag-making property in accordance with the following standard:

⊚: Excellent;

○: Without problems;

Δ: Somewhat unstable;

X: Problems arose.

EXAMPLE 5

The following materials for a multi-layer structure were co-extruded through a plurality of extruders to prepare a co-extruded parison. The parison was then biaxially stretched at a draw ratio of each about 3 times in machine and cross directions by the known double bubble process to obtain a heat-shrinkable multi-layer film.

① Outermost layer: Co-PET (BELL PET IFG-8L, trade name, product of Kanebo, Ltd., IV value: 0.8);

② Intermediate layer: 6.66 PA (AMILAN CM6241, trade name, product of Toray Industries, Inc.);

③ Core layer: EVOH (EVAL EP-G156B, trade name, product of Kuraray Co., Ltd., ethylene content: 47 mol %);

④ Adhesive layer: acidly modified EEA (EX404, trade name, product of Mitsui-Du' Pont Polychemicals Co., Ltd.);

⑤ Innermost layer (sealing resin layer): a composition obtained by blending a mixture of AFFINITY™ FW 1650 and AFFINITY™ PL 1840, which are ethylene-1-octene copolymers shown in Table 1 and produced by Dow Chemical Company, in a weight ratio of 70:30 with 3 PHR of a lubricant (masterbatch obtained by adding 2 wt. % of erucic amide and 4 wt. % of aluminum silicate to LDPE).

The structure of the multi-layer film thus obtained was composed of the outermost layer/adhesive layer/intermediate layer/core layer/adhesive layer/innermost layer in order from the outside. The thickness thereof was 39 μm in total of 2/1/6/5/1/24 (μm) from the outside.

EXAMPLE 6

A heat-shrinkable multi-layer film was produced in the same manner as in Example 5 except that the resin used in the innermost layer in Example 5 was changed to a composition obtained by blending a mixture of AFFINITY™ PF 1140, which is an ethylene-1-octene copolymer shown in Table 1 and produced by Dow Chemical Company, and VLDPE (SUMIKATHENE FZ251-1, trade name, product of Sumitomo Chemical Co., Ltd.; density: 0.916 g/cm$^3$, MFR: 2.0 g/10 min, Mw/Mn: 3.8, melting point: 118° C.) in a weight ratio of 40:60 with 3 PHR of a lubricant (masterbatch obtained by adding 2 wt. % of erucic amide and 4 wt. % of aluminum silicate to LDPE).

EXAMPLE 7

A heat-shrinkable multi-layer film was produced in the same manner as in Example 5 except that the resin used in the innermost layer in Example 5 was changed to a composition obtained by blending a mixture of AFFINITY™ PF 1140, which is an ethylene-1-octene copolymer shown in Table 1 and produced by Dow Chemical Company, and VLDPE (DOWLEX 2047, trade name, product of Dow Chemical Company; density: 0.917 g/cm$^3$, MFR: 2.3 g/10 min, Mw/Mn: 3.8, melting point: 120° C.) in a weight ratio of 40:60 with 3 PHR of a lubricant (masterbatch obtained by adding 2 wt. % of erucic amide and 4 wt. % of aluminum silicate to LDPE).

EXAMPLE 8

In Example 8, an extruded parison was exposed to electron beam (EB) and then biaxially stretched at a draw ratio of each about 3 times in machine and transversal directions by the known double bubble process to obtain a heat-shrinkable multi-layer film.

The film was composed of:
① Outermost layer: AFFINITY™ FW 1650, which is an ethylene-1-octene copolymer shown in Table 1 and produced by Dow Chemical Company (to which no slip agent was added);
② Intermediate layer 1: EMAA (NUCREL AN 4217C, trade name, product of Mitsui-Du' Pont Polychemicals Co., Ltd., density: 0.94 g/cm$^3$, MFR: 2.4 g/10 min, melting point: 87° C.);
③ Core layer: a composition obtained by adding a plasticizer, a stabilizer and the like to PVDC (product of Kureha Chemical Co., Ltd., $\eta_{sp/c}$: 0.057);
④ Adhesive layer: EVA-1 (EVATATE PC-149, trade name, density: 0.94 g/cm$^3$, MFR: 4.2 g/10 min, melting point: 92° C.);
⑤ Intermediate layer 2: EVA-1 (NUC3753, trade name, product of Nippon Unicar, density: 0.94 g/cm$^3$, MFR: 1.5 g/10 min, melting point: 93° C.);
⑥ Innermost layer: a composition obtained by blending AFFINITY™ FW 1650 shown in Table 1 and produced by Dow Chemical Company with 3 PHR of a lubricant (masterbatch obtained by adding 2 wt. % of erucic amide and 4 wt. % of aluminum silicate to LDPE).

The structure of the multi-layer film thus obtained was composed of the outermost layer/adhesive layer/intermediate layer 1/adhesive layer/core layer/adhesive layer/intermediate layer 2/innermost layer in order from the outside. The thickness thereof was 58 μm in total of 3/23/1.5/7/1.5/12/10 (μm) from the outside.

Comparative Example 7

A heat-shrinkable multi-layer film was produced in the same manner as in Example 5 except that the resin used in the innermost layer in Example 5 was changed to the conventionally known VLDPE (VL-401, trade name, product of Sumitomo Chemical Co., Ltd.; density: 0.906 g/cm$^3$, MFR: 3.3 g/10 min, Mw/Mn: 3.8, melting point: 114° C.).

Comparative Example 8

A heat-shrinkable multi-layer film was produced in the same manner as in Example 8 except that the resin used in the innermost layer in Example 8 was changed to the conventionally known VLDPE (VL-401, trade name, product of Sumitomo Chemical Co., Ltd.; density: 0.906 g/cm$^3$, MFR: 3.3 g/10 min, Mw/Mn: 3.8, melting point: 114° C.)

Comparative Example 9

A heat-shrinkable multi-layer film was produced in the same manner as in Example 8 except that the resin used in the innermost layer in Example 8 was changed to the conventionally known Metallocene VLDPE (EXACT 3010, trade name, product of EXXON Company; density: 0.900 g/cm$^3$, MFR: 3.5 g/10 min, Mw/Mn: 2.2, melting point: 86° C.). In the multi-layer film obtained in accordance with Comparative Example 9, melt fracture was observed in the film, and its optical properties were poor, so that the evaluation of other performance properties were not conducted.

The results of Examples 5–8 and Comparative Examples 7–9 are shown in Table 5.

TABLE 5

|  | Haze (%) | Resistance to boiling | Puncture resistance | Low-temperature resistance | Low-temperature sealability | Sealability through contamination | Hot tack property | Bag-making property |
|---|---|---|---|---|---|---|---|---|
| Ex. 5 | 2.0 | ⊚ | ⊚ | ⊚ | ⊚ | ⊚ | ⊚ | ○ |
| Ex. 6 | 3.0 | ○ | ○ | ⊚ | ⊚ | ⊚ | ⊚ | ○ |
| Ex. 7 | 2.0 | ○ | ○ | ⊚ | ⊚ | ⊚ | ⊚ | ○ |
| Ex. 8 | ⊚ | ⊚ | ⊚ | ⊚ | ⊚ | ⊚ | ⊚ | ⊚ |
| Comp. Ex. 7 | 5.0 | ○ | ○ | x | ○ | ○ | ○ | x (Blocking) |
| Comp. Ex. 8 | 5.0 | x | Δ | x | ○ | ○ | x | x (Blocking) |
| Comp. Ex. 9 | 10.0 | — | — | — | — | — | — | — |

Results of Extrusion

In Comparative Example 9, increase in torque was observed in the extruder, melt fracture occurred in the film, and so it was impossible to form any film of commercial value.

The reason for this is truly shown from the fact that even in PEs obtained by using a metallocene catalyst, the PE obtained by using the conventional metallocene catalyst has a low melt tension and a high torque in kneading by a Brabender mixer, while the PE (AFFINITY™) obtained by using the constrained geometry catalyst and used in the present invention has a high melt tension and a low torque in kneading by a Brabender mixer. In Examples 5–8 where the constrained geometry catalyst-VLDPEs, or the constrained geometry catalyst-VLDPE and the conventional VLDPE were used in combination, it was observed that bubble stability in the bubble process upon the formation of each multi-layer film becomes better, and the stretchability of the films is improved.

Evaluation Results of Physical Properties

In all of Examples 5–8 where the sealing resin layer (innermost layer) according to the present invention is provided, excellent effects were shown in sealing properties such as good sealability through contamination, high and stable sealing strength, wide range of sealing conditions, low-temperature sealability and hot tack property, optical properties such as clarity, and mechanical strength such as puncture resistance. In particular, when the layers of the ethylene-1-octene copolymer obtained by using the constrained geometry catalyst are provided as both outermost layer and innermost layer (Example 8), there can be provided a heat-shrinkable multi-layer film having the excellent various properties as described above and moreover having extremely good blocking resistance and slip property and excellent bag-making property.

On the other hand, blocking was observed in the sealing resin layer of Comparative Example 7. The multi-layer film according to Comparative Example 8 involved a problem of drop strength (low-temperature resistance). In comparative example 9, it was difficult to form a film, melt fracture was observed in the film, and the resultant film had poor optical properties.

What is claimed is:

1. A heat-shrinkable multi-layer film consisting essentially of four layers (A/D1/B/C), wherein a thermoplastic resin layer is the outermost layer (A), a gas barrier resin layer is a core layer (B), a sealing resin layer is the innermost layer (C), and an intermediate layer (D1) is provided between the outermost layer (A) and the core layer (B), and optionally including an adhesive layer between the individual layers, and further wherein
   (1) the sealing resin layer of the innermost layer (C) is a layer formed of a resin material (b) comprising a linear ethylene-1-octene copolymer (a) obtained by using a constrained geometry catalyst and having a 1-octene content not lower than 1 wt. % but lower than 20 wt. % and a density higher than 0.885 g/cm$^3$ but not higher than 0.960 g/cm$^3$,
   (2) the intermediate layer (D1) is formed of at least one resin (c) selected from the group consisting of polyamide resins, thermoplastic polyester resins and ethylene copolymer resins,
   (3) the outermost layer (A) is formed of at least one resin (e) selected from the group consisting of polyolefin resins, thermoplastic polyester resins, polyamide resins and the ethylene-1-octene copolymer (a), and
   (4) at least one of the outermost layer (A) and the intermediate layer (D1) comprises a polyamide resin or a thermoplastic polyester resin.

2. The heat-shrinkable multi-layer film according to claim 1, wherein the resin material (b) forming the sealing resin layer of the innermost layer (C) is a resin material comprising 10–100 wt. % of the ethylene-1-octene copolymer (a) and 0–90 wt. % of at least one polymer (d) selected from the group consisting of linear low density polyethylene (LLDPE), very low density polyethylene (VLDPE) and ethylene-1-octene copolymer elastomers obtained by using a constrained geometry catalyst and having an 1-octene content of 18 wt. % or higher and a density of 0.885 g/cm$^3$ or lower.

3. The heat-shrinkable multi-layer film according to claim 2, wherein the resin material (b) forming the sealing resin layer of the innermost layer (C) is the ethylene-1-octene copolymer (a).

4. The heat-shrinkable multi-layer film according to claim 2, wherein the resin material (b) forming the sealing resin layer of the innermost layer (C) is a resin composition containing 30–95 wt. % of the ethylene-1-octene copolymer (a) and 5–70 wt. % of said at least one polymer (d).

5. The heat-shrinkable multi-layer film according to claim 1, wherein the ethylene-1-octene copolymer (a) is a substantially linear ethylene-1-octene copolymer (a1) having an 1-octene content of 7–15 wt. % and a density of 0.895–0.915 g/cm$^3$.

6. The heat-shrinkable multi-layer film according to claim 5, wherein the resin material (b) forming the sealing resin layer of the innermost layer (C) is a resin material comprising 60–100 wt. % of the substantially linear ethylene-1-octene copolymer (a1) having an 1-octene content of 7–15 wt. % and a density of 0.895–0.915 g/cm$^3$ and 0–40 wt. % of at least one polymer (d) selected from the group consisting of linear low density polyethylene (LLDPE), very low density polyethylene (VLDPE) and ethylene-1-octene copolymer elastomers obtained by using a constrained geometry catalyst and having an 1-octene content of 18 wt. % or higher and a density of 0.885 g/cm$^3$ or lower, and containing no lubricant.

7. The heat-shrinkable multi-layer film according to claim 1, wherein the polyamide resin forming the intermediate layer (D1) is nylon 6.66 or nylon 6.12.

8. The heat-shrinkable multi-layer film according to claim 1, wherein the ethylene copolymer resin forming the intermediate layer (D1) is an ethylene-methacrylic acid copolymer (EMAA) resin or an ethylene-vinyl acetate copolymer (EVA) resin.

9. The heat-shrinkable multi-layer film according to claim 1, wherein the intermediate layer (D1) is nylon 6.66 or nylon 6.12 and wherein the gas barrier resin forming the core layer (B) is at least one resin selected from the group consisting of ethylene-vinyl alcohol copolymer resins and polyvinylidene chloride resins.

10. The heat-shrinkable multi-layer film according to claim 1, wherein the polyolefin resin forming the outermost layer (A) is a linear low density polyethylene (LLDPE) or a very low density polyethylene (VLDPE).

11. A heat-shrinkable multi-layer film consisting essentially of five layers (A/D1/B/D2/C), wherein a thermoplastic resin layer is the outermost layer (A), a gas barrier layer is a core layer (B), a sealing resin layer is the innermost layer (C), an intermediate layer (D1) is provided between the outermost layer (A) and the core layer (B), and an intermediate layer (D2) is provided between the core layer (B) and the innermost layer (C), and optionally including an adhesive layer between the individual layers, and further wherein
   (1) the sealing resin layer of the innermost layer (C) is a layer formed of a resin material (b) comprising a linear ethylene-1-octene copolymer (a) obtained by using a constrained geometry catalyst and having a 1-octene content not lower than 1 wt. % but lower than 20 wt. % and a density higher than 0.885 g/cm$^3$ but not higher than 0.960 g/cm$^3$,
   (2) the intermediate layer (D1) is formed of at least one resin (c) selected from the group consisting of polyamide resin, thermoplastic polyester resin and ethylene copolymer resins,
   (3) the intermediate layer (D2) is formed of at least one resin (c) selected from the group consisting of polyamide resins, thermoplastic polyester resins and ethylene copolymer resins,
   (4) the outermost layer (A) is formed of at least one resin (e) selected from the group consisting of polyolefin resins, thermoplastic polyester resins, polyamide resins and the ethylene-1-octene copolymer (a), and
   (5) at least one of the outermost layer (A), the intermediate layer (D1) and the intermediate layer (D2) comprises a polyamide resin or a thermoplastic polyester resin.

12. The heat-shrinkable multi-layer film according to claim 1, wherein the ethylene-1-octene copolymer (a) forming the outermost layer (A) is a linear ethylene-1-octene copolymer (a1) having an 1-octene content of 7–15 wt. % and a density of 0.895–0.915 g/cm$^3$.

13. The heat-shrinkable multi-layer film according to claim 1, wherein the thermoplastic resin forming the outermost layer (A) is a resin material comprising 60–100 wt. % of the linear ethylene-1-octene copolymer (a1) having an 1-octene content of 7–15 wt. % and a density of 0.895–0.915 g/cm$^3$ and 0–40 wt. % of at least one polymer (d) selected from the group consisting of linear low density polyethylene (LLDPE), very low density polyethylene (VLDPE) and ethylene-1-octene copolymer elastomers obtained by using a constrained geometry catalyst and having an 1-octene content of 18 wt. % or higher and a density of 0.885 g/cm$^3$ or lower, and containing no lubricant.

14. The heat-shrinkable multi-layer film according to claim 11, wherein the gas barrier resin forming the core layer (B) is at least one gas barrier resin selected from the group consisting of ethylene-vinyl alcohol copolymer (EVOH) resins, polyvinylidene chloride (PVDC) resins and poly(m-xylylene adipamide).

15. The heat-shrinkable multi-layer film according to claim 1, wherein the film is exposed to electron beam.

16. The heat-shrinkable multi-layer film according to claim 1, wherein the film has a laminated structure composed of the outermost layer (A)/adhesive layer/intermediate layer (D1)/core layer (B)/adhesive layer/innermost layer (C) in order from the outermost layer.

17. The heat-shrinkable multi-layer film according to claim 1, wherein the film has a laminated structure composed of the outermost layer (A)/adhesive layer/intermediate layer (D1)/adhesive layer/core layer (B)/adhesive layer/innermost layer (C) in order from the outermost layer.

18. The heat-shrinkable multi-layer film according to claim 1, wherein the film has a laminated structure composed of the outermost layer (A)/intermediate layer (D1)/adhesive layer/core layer (B)/adhesive layer/innermost layer (C) in order from the outermost layer.

19. The heat-shrinkable multi-layer film according to claim 11, wherein the film has a laminated structure composed of the outermost layer (A)/intermediate layer (D1)/adhesive layer/core layer (B)/adhesive layer/intermediate layer (D2)/innermost layer (C) in order from the outermost layer.

20. The heat-shrinkable multi-layer film according to claim 11, wherein the thermoplastic resin forming the outermost layer (A) is linear low density polyethylene (LLDPE) or very low density polyethylene (VLDPE).

21. The heat-shrinkable multi-layer film according to claim 11, wherein the film is exposed to electron beam from the side of the outermost layer (A).

* * * * *

UNITED STATES PATENT AND TRADEMARK OFFICE
CERTIFICATE OF CORRECTION

PATENT NO. : 6,342,282 B1  
DATED : January 29, 2002  
INVENTOR(S) : Junji Yoshii et al.

Page 1 of 1

It is certified that error appears in the above-identified patent and that said Letters Patent is hereby corrected as shown below:

<u>Column 25,</u>  
Line 16, change "claim 11" to -- claim 1 --.

Signed and Sealed this

Fourteenth Day of May, 2002

*Attest:*

JAMES E. ROGAN  
*Attesting Officer*  *Director of the United States Patent and Trademark Office*

UNITED STATES PATENT AND TRADEMARK OFFICE
CERTIFICATE OF CORRECTION

PATENT NO.    : 6,342,282 B1
DATED         : January 29, 2002
INVENTOR(S)   : Junji Yoshii et al.

It is certified that error appears in the above-identified patent and that said Letters Patent is hereby corrected as shown below:

<u>Title page,</u>
Item [73], Assignee, please add the following as an Assignee:
-- Kureha Plastics Co., Inc., Ibaraki (JP) --.

Signed and Sealed this

Twenty-fifth Day of March, 2003

JAMES E. ROGAN
*Director of the United States Patent and Trademark Office*